UNITED STATES PATENT OFFICE.

HERMANN ENDEMANN, OF BROOKLYN, NEW YORK.

MANUFACTURE OF GLUCOSE AND GRAPE-SUGAR.

SPECIFICATION forming part of Letters Patent No. 269,779, dated December 26, 1882.

Application filed October 17, 1882. (No specimens.)

*To all whom it may concern:*

Be it known that I, HERMANN ENDEMANN, a citizen of the United States, residing at Brooklyn, in the county of Kings and State of New York, have invented new and useful Improvements in the Manufacture of Glucose and Grape-Sugar, of which the following is a specification.

It is a well-known fact that the glucose-sirups and artificial grape-sugars of commerce, being manufactured with the aid of sulphuric acid, contain sulphate of lime, a substance which is universally considered deleterious to the health of the consumers of such glucose or grape-sugar, or of the articles prepared from or being mixed with the same. This disadvantage is obviated by my invention, which consists in the production of glucose or grape-sugar by exposing starch to the action of the so-called "orthophosphoric acid" or "tribasic phosphoric acid," either already prepared or formed during the progress of the conversion.

In carrying out my invention I bring the starch, water, and the orthophosphoric acid into a so-called "converter," and heat the mixture under pressure to 140° centigrade, until the conversion is completed, which may be tested in the ordinary manner known to chemists.

For the manufacture of grape-sugar I use the phosphoric acid in the proportion of fifty kilograms to each one thousand kilograms of air dry starch, or a correspondingly greater quantity of green or wet starch, and two thousand kilograms of water, or correspondingly less if wet starch is used. The manipulation is the same as in the manufacture of grape-sugar by the action of sulphuric acid upon starch. If it is desired to manufacture a glucose less acid may be taken, or the heating may be discontinued at an earlier period. When the conversion is completed to the desired degree the liquor is treated with a base, which forms with the phosphoric acid insoluble salts, by preference lime, for the purpose of neutralizing the free acid. The mixture is then filtered for the purpose of separating the insoluble substances from the liquid, which is finally decolorized by means of bone-black and evaporated to the desired consistency, and, in the case of grape-sugar, allowed to crystallize.

Instead of using for the conversion orthophosphoric acid already prepared, such materials as, for instance, bibasic phosphoric acid may be used, which during the conversion may be transformed into orthophosphoric acid.

The advantages of my method of producing glucose or grape-sugars are, first, that the bone-black used for the decolorization is not injured, as it is known to be by liquors containing sulphate of lime; second, that the products obtained by my method do not contain any substances deleterious to the health of the consumers.

In the manufacture of grape-sugar from starch by means of sulphuric acid nitric acid is often used in conjunction with the former, but always in comparatively small quantity. Such nitric acid may also be used with advantage with orthophosphoric acid.

I am aware that various unsuccessful attempts have been made to produce glucose from starch by the action of concentrated phosphoric acid, and I distinctly disclaim the use of such concentrated phosphoric acid.

What I claim as new, and desire to secure by Letters Patent, is—

1. The within-described method of producing glucose and grape-sugar by exposing starch to the action of orthophosphoric acid, either already prepared or formed during the progress of conversion.

2. The within-described process of producing glucose and grape-sugar by exposing starch to the action of orthophosphoric acid at a temperature above the boiling-point of water, and under pressure higher than the atmospheric pressure.

In testimony whereof I have hereunto set my hand and seal in the presence of two subscribing witnesses.

H. ENDEMANN. [L. S.]

Witnesses:
W. HAUFF,
E. F. KASTENHUBER.